(12) United States Patent
Jones, Jr. et al.

(10) Patent No.: US 12,123,184 B2
(45) Date of Patent: Oct. 22, 2024

(54) GASKET SEALS FOR DRAIN CLOSURES

(71) Applicant: Danco, Inc., Irving, TX (US)

(72) Inventors: Robert Clifton Jones, Jr., Rockwall, TX (US); Muhammad Towheed Hossain, Dallas, TX (US); Casey J. Fregoe, The Colony, TX (US)

(73) Assignee: Danco, Inc., Irving, TX (US)

( * ) Notice: Subject to any disclaimer, the term of this patent is extended or adjusted under 35 U.S.C. 154(b) by 0 days.

(21) Appl. No.: 17/237,762

(22) Filed: Apr. 22, 2021

(65) Prior Publication Data

US 2021/0238833 A1   Aug. 5, 2021

Related U.S. Application Data

(62) Division of application No. 16/161,475, filed on Oct. 16, 2018.

(60) Provisional application No. 62/577,304, filed on Oct. 26, 2017.

(51) Int. Cl.
*E03C 1/23* (2006.01)
*F16J 15/3268* (2016.01)
*F16J 15/3284* (2016.01)

(52) U.S. Cl.
CPC ......... *E03C 1/2306* (2013.01); *F16J 15/3268* (2013.01); *F16J 15/3284* (2013.01)

(58) Field of Classification Search
CPC ....... E03C 1/23–2308; E03C 2001/2311–2317
See application file for complete search history.

(56) References Cited

U.S. PATENT DOCUMENTS

| | | | | | |
|---|---|---|---|---|---|
| 1,931,568 | A | * | 10/1933 | Brotz | E03C 1/23 4/584 |
| 2,915,762 | A | * | 12/1959 | Kivela | A47K 1/14 403/348 |
| 3,096,527 | A | * | 7/1963 | Harry | E03C 1/262 285/137.11 |
| 3,314,085 | A | * | 4/1967 | Minella | E03C 1/23 4/689 |

(Continued)

OTHER PUBLICATIONS

Danco, "Chrome 80811 Touch-Toe Tub Stopper". Available Oct. 28, 2013. <https://www.amazon.com/Universal-Touch-Toe-Button-Stopper-80811/dp/B00G99D062> (Year: 2013).*

(Continued)

*Primary Examiner* — David P Angwin
*Assistant Examiner* — Nicholas A Ros
(74) *Attorney, Agent, or Firm* — Thomas | Horstemeyer, LLP

(57) ABSTRACT

An exemplary embodiment, among others, of the present disclosure is directed to a drain closure assembly. Such an assembly has a domed cap at a top portion of the drain closure assembly and a flange that is positioned below the domed cap. The assembly further includes a stem that extends from below the flange to a bottom portion of the drain closure assembly and a gasket seal that is positioned around the stem at a bottom of the drain closure assembly. The gasket seal has a frusto-conical shape, wherein a top portion of the gasket seal has a wider diameter than a bottom portion of the gasket seal, and the gasket seal has a central circular opening that fits closely around the stem.

9 Claims, 15 Drawing Sheets

(56) References Cited

U.S. PATENT DOCUMENTS

| | | | | |
|---|---|---|---|---|
| 3,570,022 | A * | 3/1971 | Nealy | E03C 1/23 4/287 |
| 4,276,662 | A * | 7/1981 | Young | A47K 1/14 4/295 |
| 4,381,569 | A * | 5/1983 | Ingram | E03C 1/2306 4/689 |
| 4,908,883 | A * | 3/1990 | Rivera | E03C 1/23 4/689 |
| 6,108,828 | A * | 8/2000 | Cheng | A47K 1/14 4/286 |
| 6,363,544 | B1 * | 4/2002 | Ryan | E03C 1/23 4/689 |
| 7,458,108 | B2 * | 12/2008 | Wolf | A47K 1/14 4/290 |
| 8,499,376 | B2 * | 8/2013 | Kyung Kim | E03C 1/2306 4/689 |
| 9,060,656 | B2 * | 6/2015 | Tong | E03C 1/23 |
| 9,095,239 | B2 * | 8/2015 | Laera | E03C 1/2306 |
| 9,157,220 | B2 * | 10/2015 | Ball | E03C 1/22 |
| 10,174,488 | B1 * | 1/2019 | Yeh | A47K 1/14 |
| 2013/0269100 | A1 * | 10/2013 | Ball | E03C 1/2306 4/693 |
| 2015/0040312 | A1 * | 2/2015 | Yang | A47K 1/14 4/679 |
| 2016/0053472 | A1 * | 2/2016 | Rosko | E03C 1/2302 4/292 |

OTHER PUBLICATIONS

Danco. "Chrome 80811 Touch-Toe Tub Stopper". Available Oct. 28, 2013. <hhttps://amazon.com/Universal-Touch-Toe-Button-Stopper-80811/dp/B00G99D062> (Year: 2013).*

Danco. "Chrome80811Touch-ToeTubStopper". Available Oct. 28, 2013. <hhttps://amazon.com/Universal-Touch-Toe-Button-Stopper-80811/dp/BOO0G99D062> (Year: 2013).*

* cited by examiner

GASKET SEALS FOR DRAIN CLOSURES

CROSS-REFERENCE TO RELATED APPLICATION

This application is a divisional of co-pending U.S. utility application entitled, "GASKET SEALS FOR DRAIN CLOSURES," having Ser. No. 16/161,475, filed Oct. 16, 2018, which claims priority to U.S. provisional application entitled, "GASKET SEALS FOR DRAIN CLOSURES," having Ser. No. 62/577,304, filed Oct. 26, 2017, which are both entirely incorporated herein by reference.

TECHNICAL FIELD

The present disclosure relates to drain closures for use with bathtubs, sinks, laundry tubs, and the like, and the gaskets or seals that are used as part of the assembly of such drain closures.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
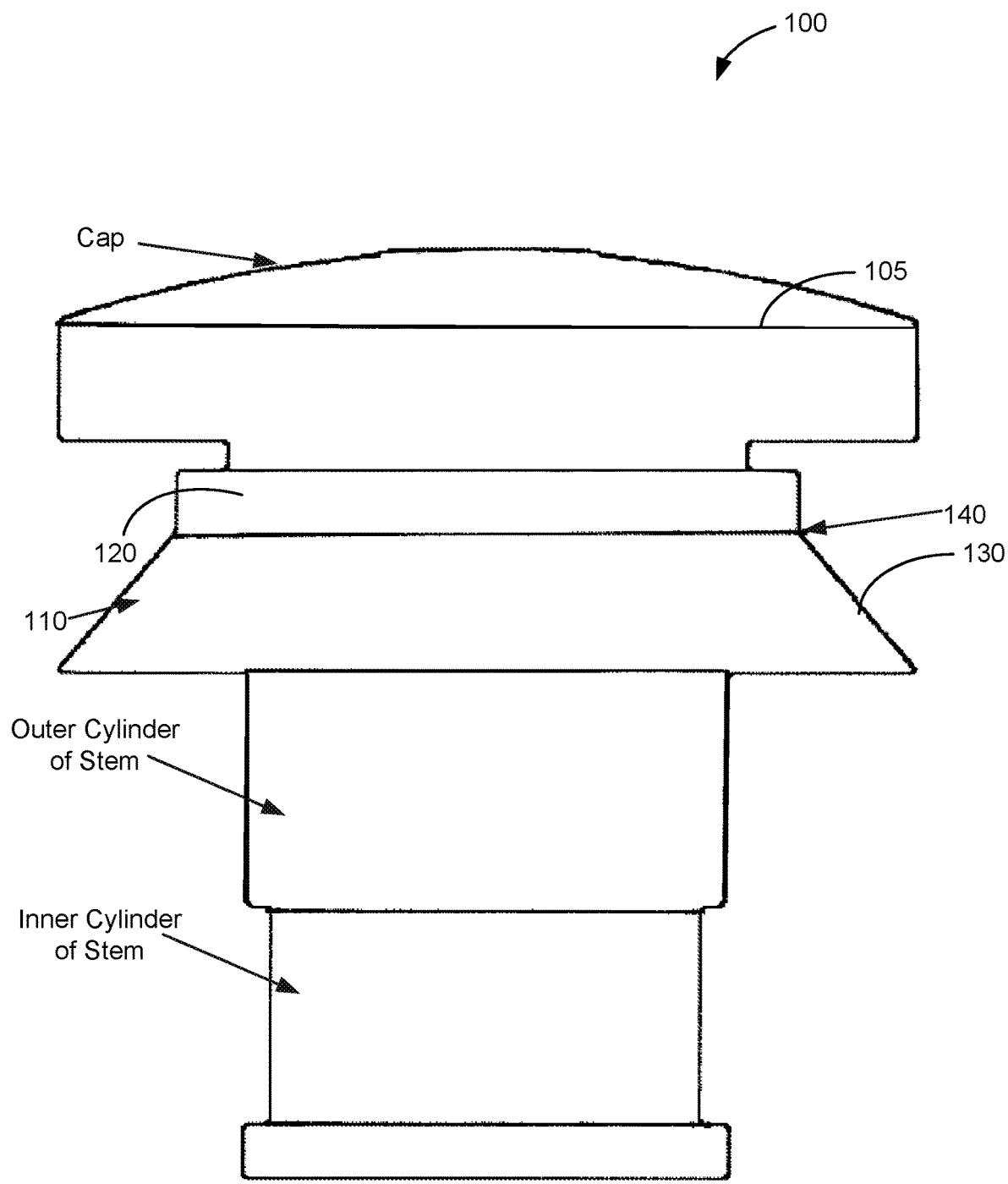
FIG. 1 is a diagram of a tub stopper assembly in accordance with embodiments of the present disclosure.

In one embodiment, in accordance with the present disclosure, a drain closure, such as a tub stopper, features a touch-toe design that pushes to open or close a drain passage. As part of an assembly of the tub stopper 100 in FIG. 1, a gasket 110 (of an elastic, resilient material, such as rubber or rubber-like material) is provided with a unique construction that improves upon a height or distance upon which the gasket 110 can be compressed to help close the drain. While conventional gaskets may feature an angled or sloped surface from the bottom edge to the top edge of the gasket, an embodiment of the gasket 110 of the present disclosure adds a top portion or ring 120 having a vertical surface or vertical wall that is positioned above the angled or sloped surface of the bottom portion 130 of the gasket 110. The top portion 120 may be characterized as having a right circular cylinder shape.

For example, in one embodiment, the top portion 120 of the gasket 110 has a central circular opening that is arranged to fit closely around an annular groove of a post or stem 150 that is underneath the head or cap 105 of the tub stopper assembly. In the example of FIG. 1, the gasket 110 is fitted around an outer cylinder of the stem 150, in which the outer cylinder is movable in a vertical direction over an inner cylinder of the stem 150. The bottom portion 130 of the gasket 110 correspondingly may be characterized as a rim, flange, or skirt having a right circular cone shape or a frusto-conical shape, in which the bottom portion 130 projects generally outwardly from the ring portion 120 of the gasket 110.

Figure 2:
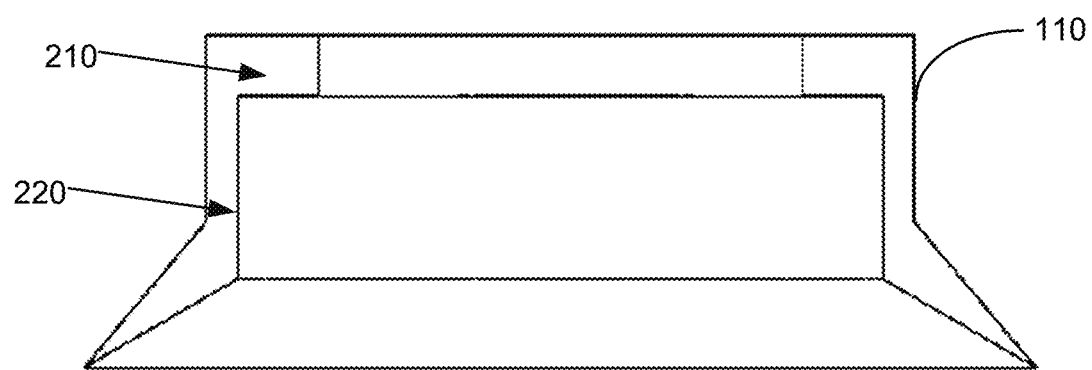
FIG. 2 is a diagram of a gasket of the tub stopper assembly in accordance with embodiments of the present disclosure.

As shown in FIG. 2, internal to an exemplary embodiment of the improved gasket structure 110, a series of concentric annular platforms 210, 220 are provided such that a force applied to a top surface of the gasket 110 causes an upper concentric annular platform 210 (having a smaller outer diameter) to be compressed before the lower concentric annular platform 220 (having a larger outer diameter as compared to the upper concentric annular platform) is compressed to create a seal over the drain opening. The respective platforms 210, 220 act as concentric o-rings within the gasket 110.

The line 140 (FIG. 1) between the upper portion 110 and the bottom portion 120 of the gasket 110 defines a hinge at which the gasket 110 is able to easily bend for various size tub drain shoes or assemblies for which the gasket 110 can be applied as part of the tub stopper assembly 100. Due to different sizes or heights of tub drain shoes, the distance to be pushed on the tub stopper 105 to create a seal may differ based on the individual requirements of the tub drain shoes/assemblies. Accordingly, embodiments of the gasket 110 of the present disclosure contain an elevated height for the gasket 110 that can accommodate varying heights of tub drain shoes. Further, in some embodiments, more than one gasket 110 at varying heights may be provided to a customer to allow the tub stopper assembly 100 to fit multiple tub drain shoes since the sizes and depths of currently available tub drain shoes are not standardized.

When the tub stopper 105 is in a closed position, the rim 120 of the gasket 110 is pressed flat against the tub drain shoe flange by the stopper dome (cap or head) to form a tight seal which closes the drain passage. In the fully closed position, the rim 130 is pressed flat against the flange of the tub drain shoe to form a tight seal which closes a drain passage. In an open position, the stopper head 105 and gasket 110 are displaced above the top of the tub drain shoe flange and the drain is then opened for drainage of liquid from the bathtub or other vessel equipped with the drain closure.

Figure 3:
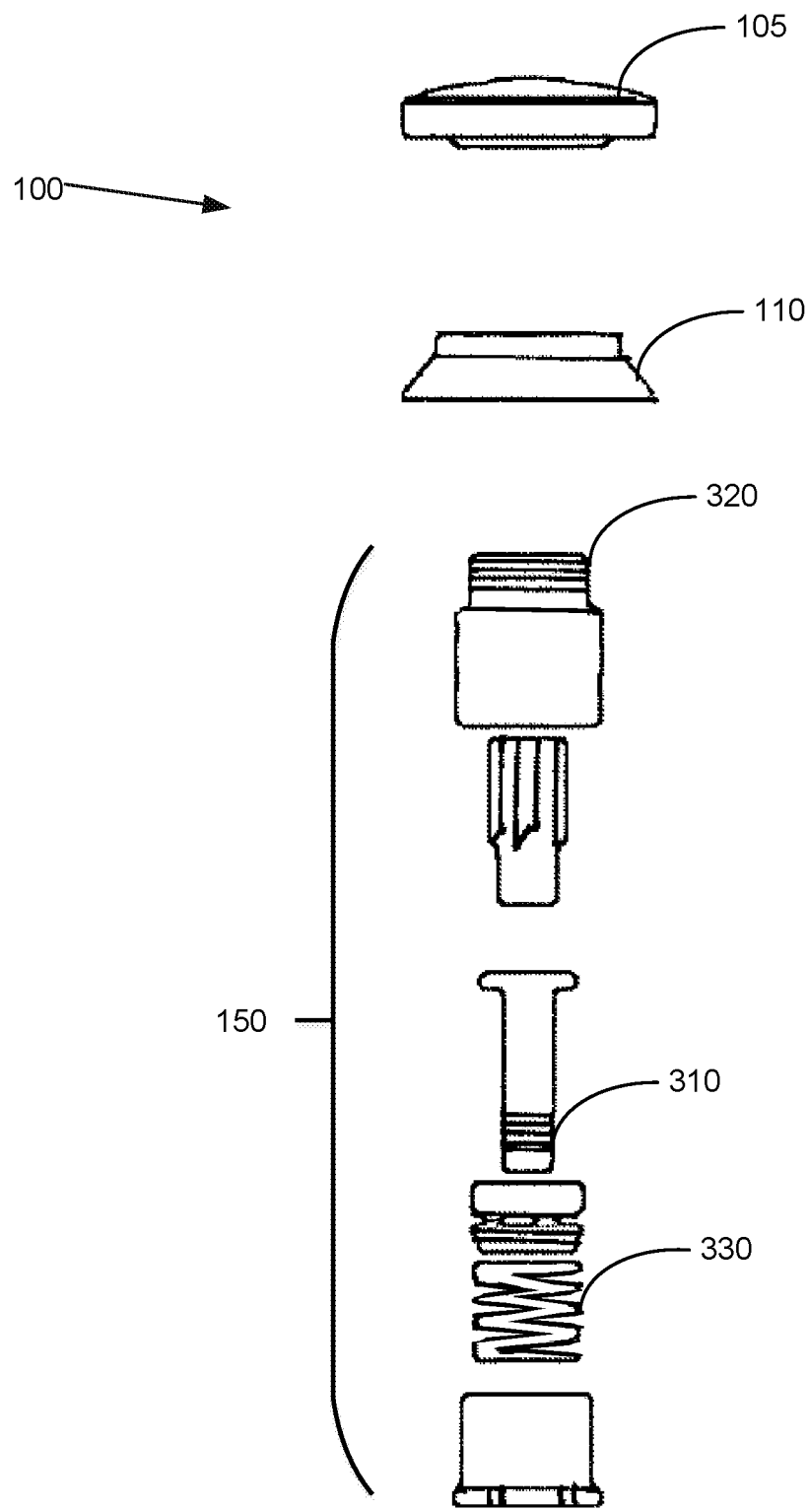
FIG. 3 is a diagram showing an exploded view of the tub stopper assembly in accordance with embodiments of the present disclosure.
Figure 4:
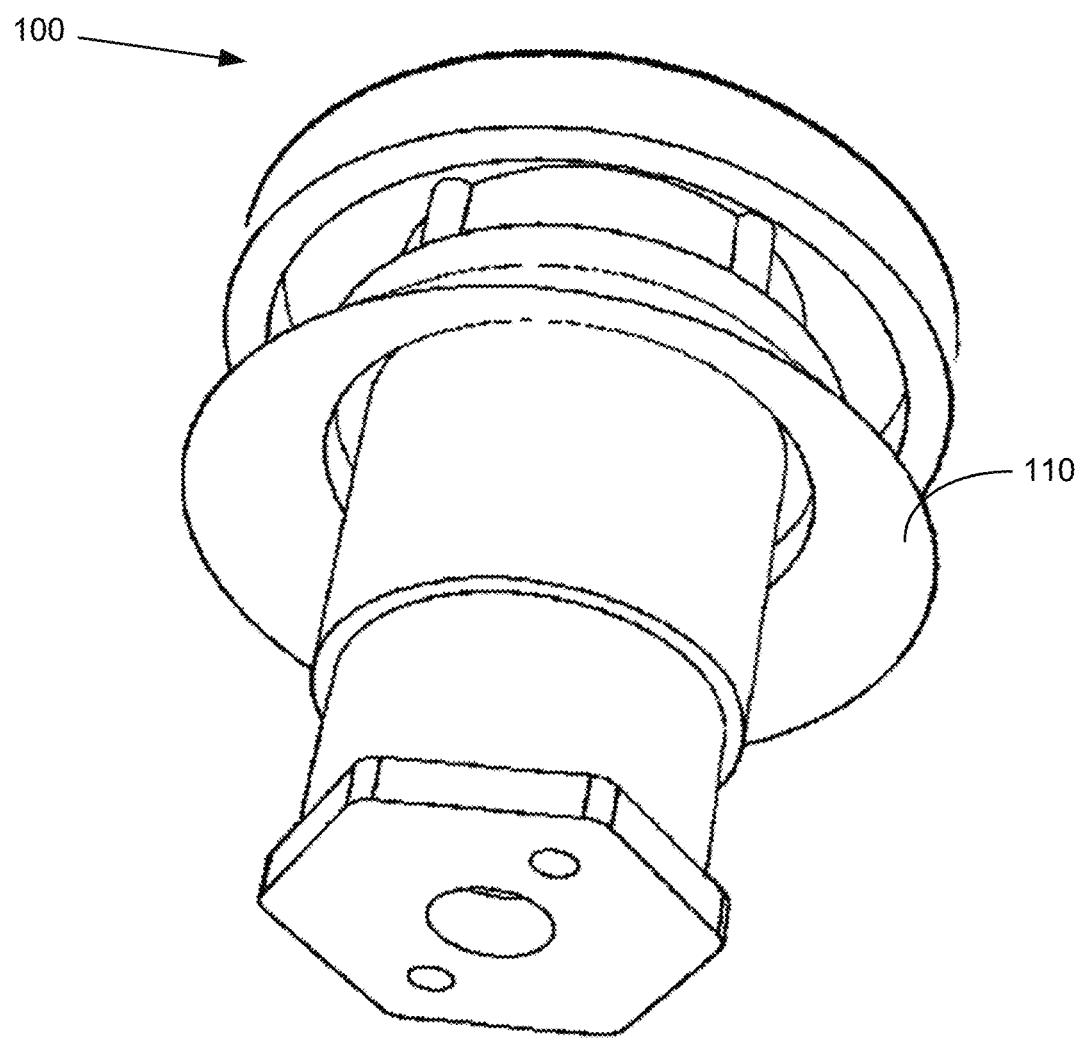
FIGS. 4-5 are diagrams showing perspective views of the tub stopper assembly in accordance with embodiments of the present disclosure.
Figure 5:
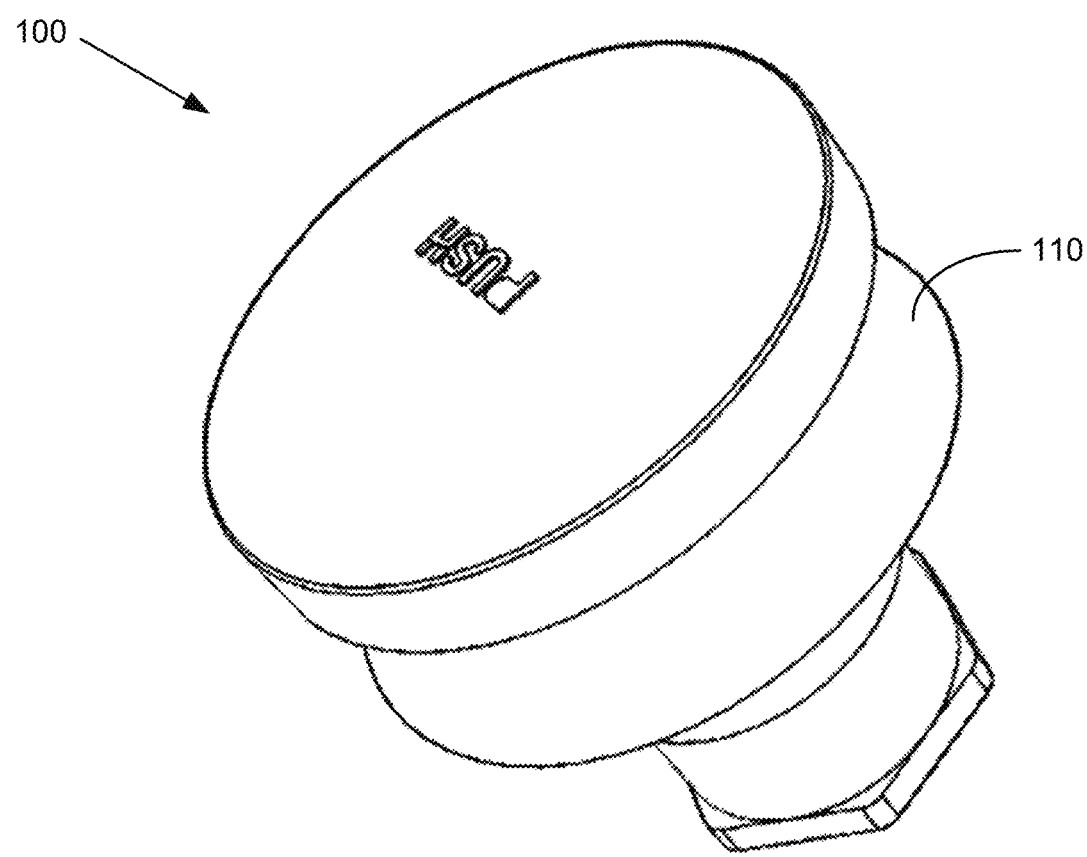
Figure 6:
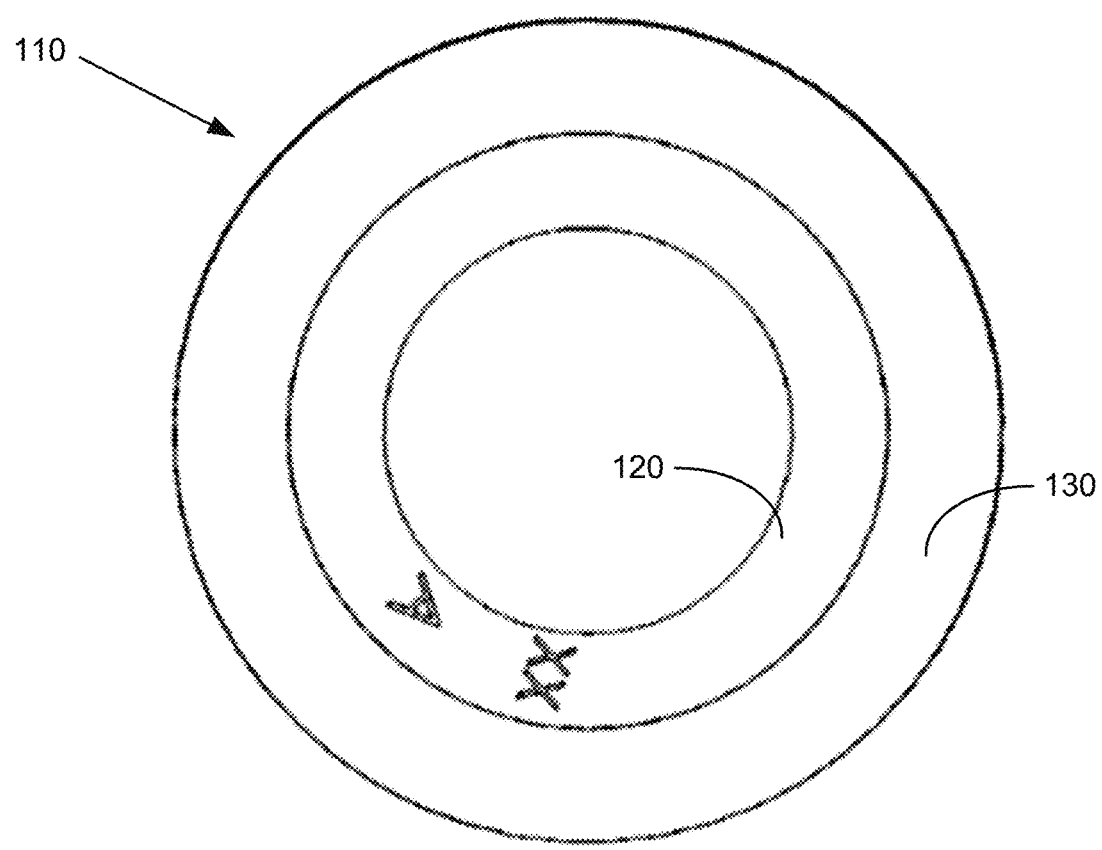
FIG. 6 is a diagram showing a top view of the gasket of the tub stopper assembly in accordance with embodiments of the present disclosure.
Figure 7:
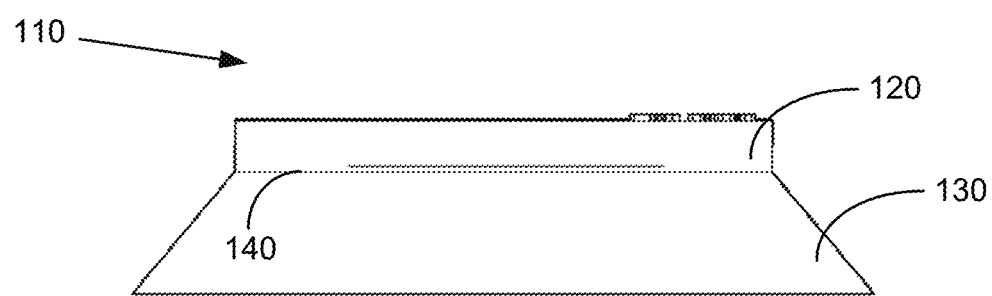
FIG. 7 is a diagram showing a side view of the gasket of the tub stopper assembly in accordance with embodiments of the present disclosure.
Figure 8:
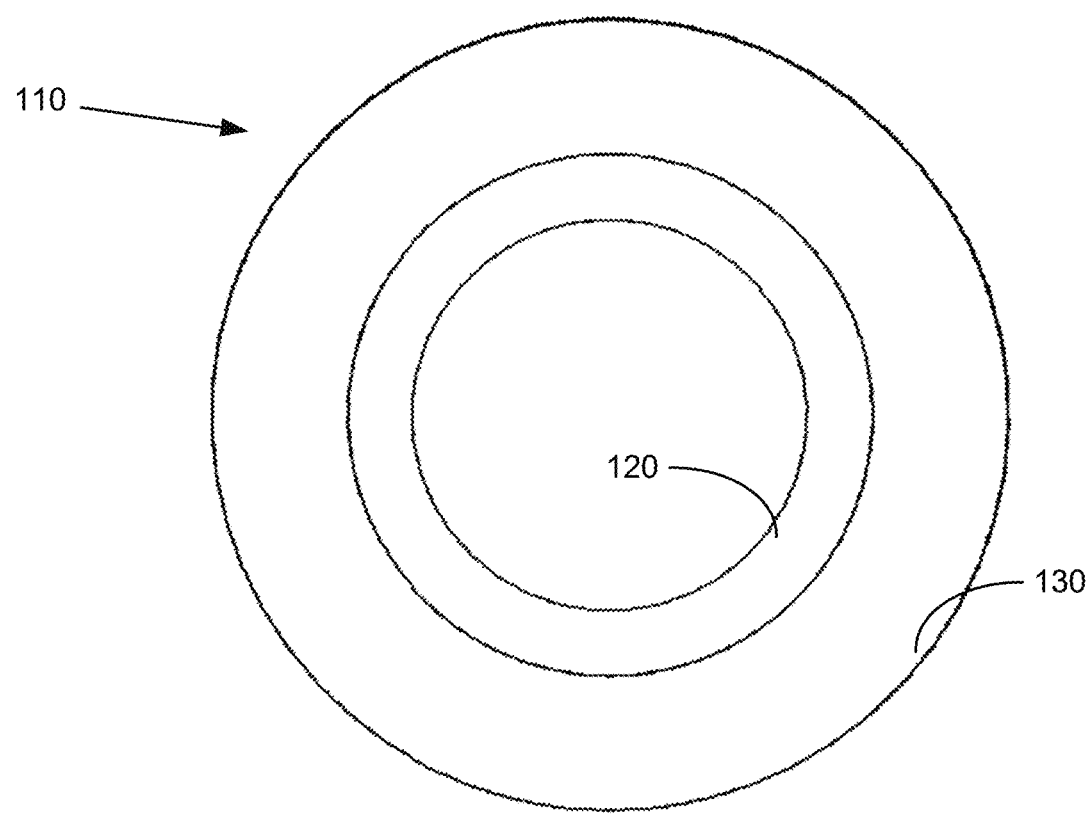
FIG. 8 is a diagram showing a bottom view of the gasket of the tub stopper assembly in accordance with embodiments of the present disclosure.
Figure 9:
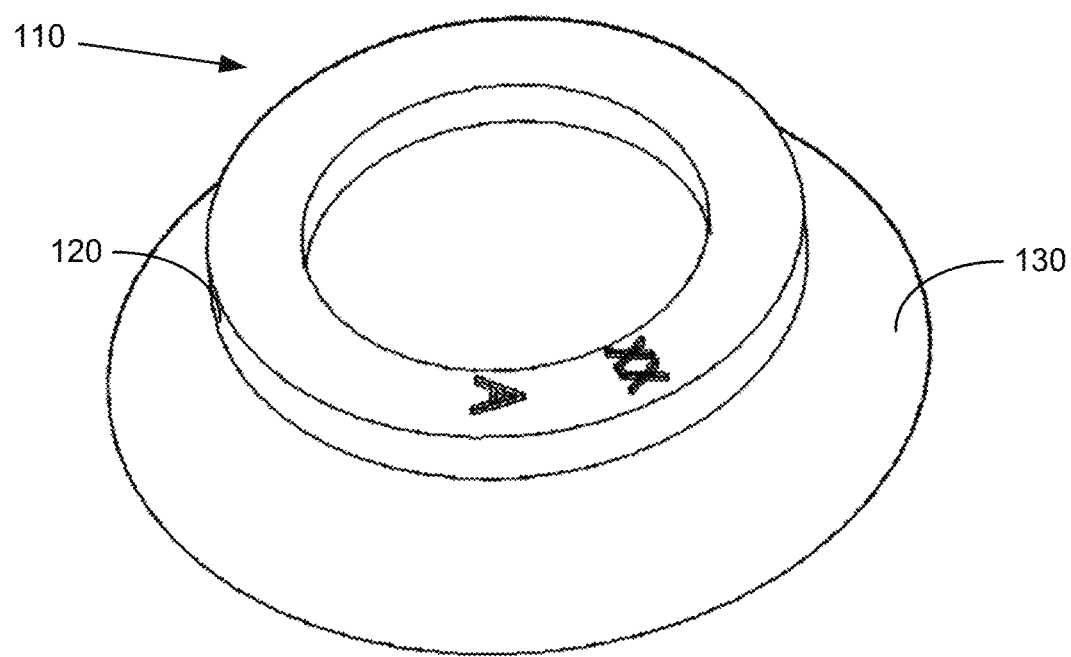
FIG. 9 is a diagram showing a perspective top view of the gasket of the tub stopper assembly in accordance with embodiments of the present disclosure.
Figure 10:
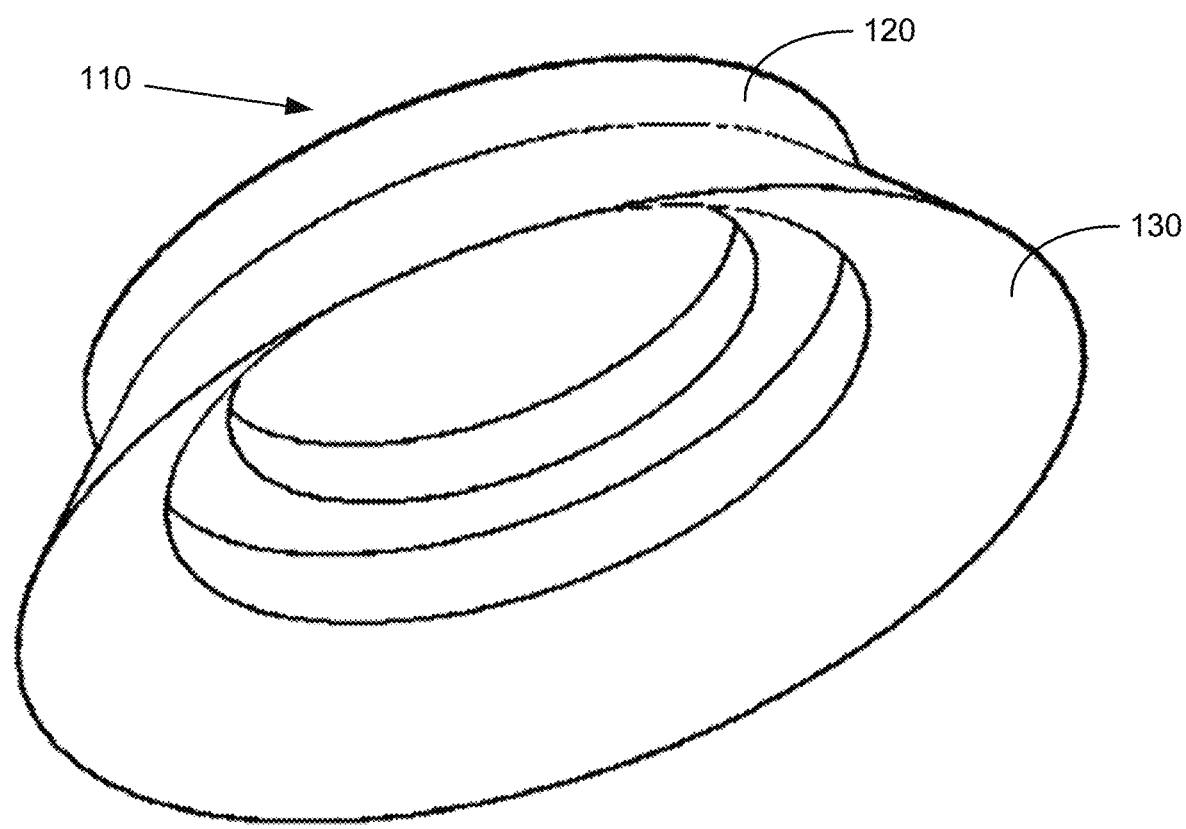
FIG. 10 is a diagram showing a perspective bottom view of the gasket of the tub stopper assembly in accordance with embodiments of the present disclosure.

Referring now to FIG. 3, an exploded view of the tub stopper assembly 100 is depicted to show the respective parts of the assembly. In installing the tub stopper 105 within a tub drain shoe for a drain, a lower end 310 of a post or stem 150 is threaded into a ring of the tub drain shoe. The cap or head 105 of the tub stopper is also threaded onto a top end 320 of the stem 150 of the assembly to complete the installation. In use of the tub stopper assembly 100, the head 105 of the stopper assembly can be moved to the closed position simply by pressing downwardly with hand or foot on the head of the stopper causing the tub stopper to be moved down the stem 150 to close a drain opening. Accordingly, the head 105 of the stopper then slides downwardly until the gasket 110 is flattened and seals tightly against the flange of the tub drain shoe. To open the tub stopper assembly, the head 105 can be depressed and spring actuated upward to raise the stopper assembly to an open position by moving the tub stopper up the stem 150. In one embodiment, the stopper assembly is spring-loaded to be moved manually into sealing position against the force of the spring 330, and has a push-button release that causes the stopper to move into the open position. FIGS. 4-5 show different perspective views of the tub stopper assembly 100. Likewise, FIG. 6 shows a top view of the gasket 110, FIG. 7 shows a side view of the gasket 110, FIG. 8 shows a bottom view of the gasket 110, FIG. 9 shows a perspective top view of the gasket 110, and FIG. 10 shows a perspective bottom view of the gasket 110.

In various embodiments, more than one gasket 110 at varying heights and dimensions may be provided to a user to allow the tub stopper assembly 100 to fit more tub drain shoes since the sizes and depths of currently available tub drain shoes are not standardized. An exemplary embodiment of the tub stopper includes a ⅜ inch threaded post or a 5/16 inch threaded post or stem. In one embodiment, among others, the head of the tub stopper features a 2 inch diameter to accommodate a drain and may also feature a plastic construction that provides durability that will not rust. One exemplary embodiment of such a tub stopper is characterized by a height of 2.25 inches (or its approximate) and a width of approximately 2.0 inches (or its approximate).

Figure 11A:
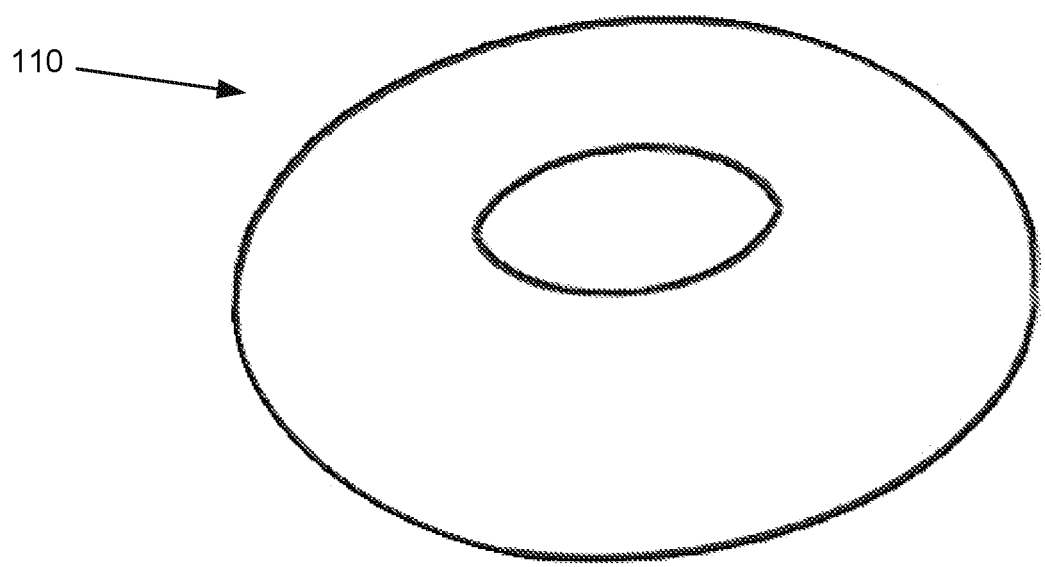
FIG. 11A is a diagram showing a perspective view of a gasket of the tub stopper assembly in accordance with embodiments of the present disclosure.
Figure 11B:
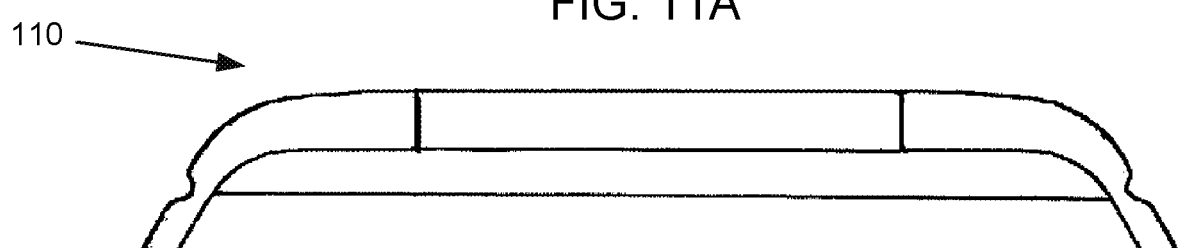
FIGS. 11B-11D are diagrams showing versions of the gasket of the tub stopper assembly at various dimensions in accordance with embodiments of the present disclosure.
Figure 11C:
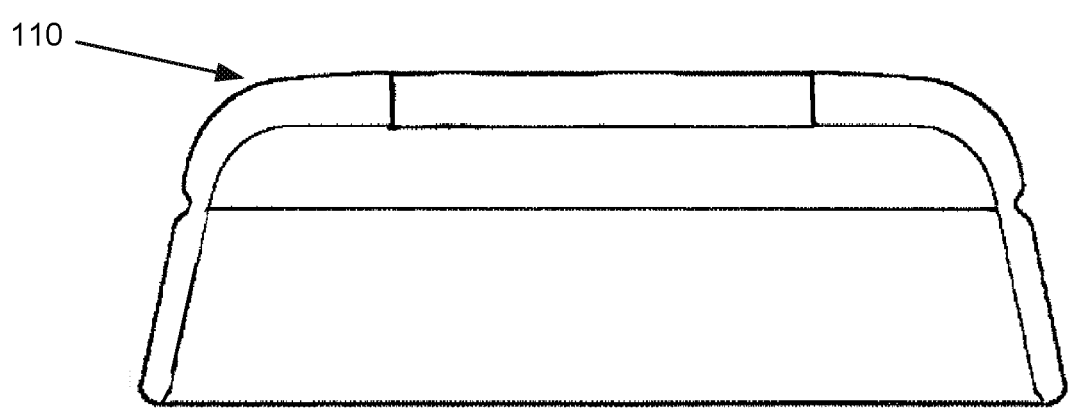
Figure 11D:
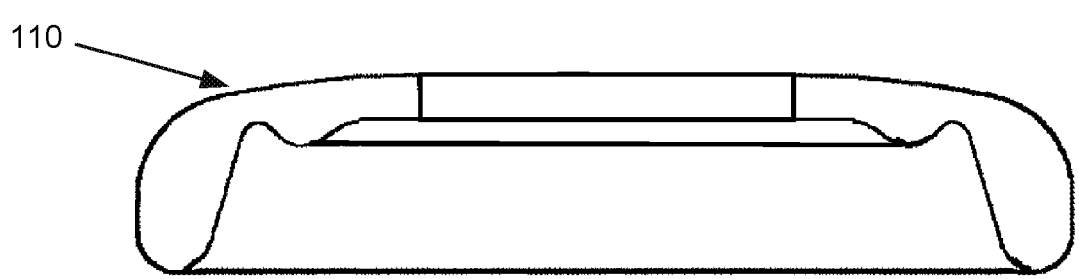

As an illustration, FIG. 11A shows a perspective view of an embodiment of a gasket 110 in accordance with embodiments of the present disclosure. The dimensions of the gasket 110 may vary in accordance with different embodiments, such as the respective height and width, as represented in FIGS. 11B-11D. Further, the internal structures (e.g., annular platform(s)) of the gasket 110 may also have different shapes or dimensions in various embodiments, as represented in FIGS. 11B-11D.

Figure 12:
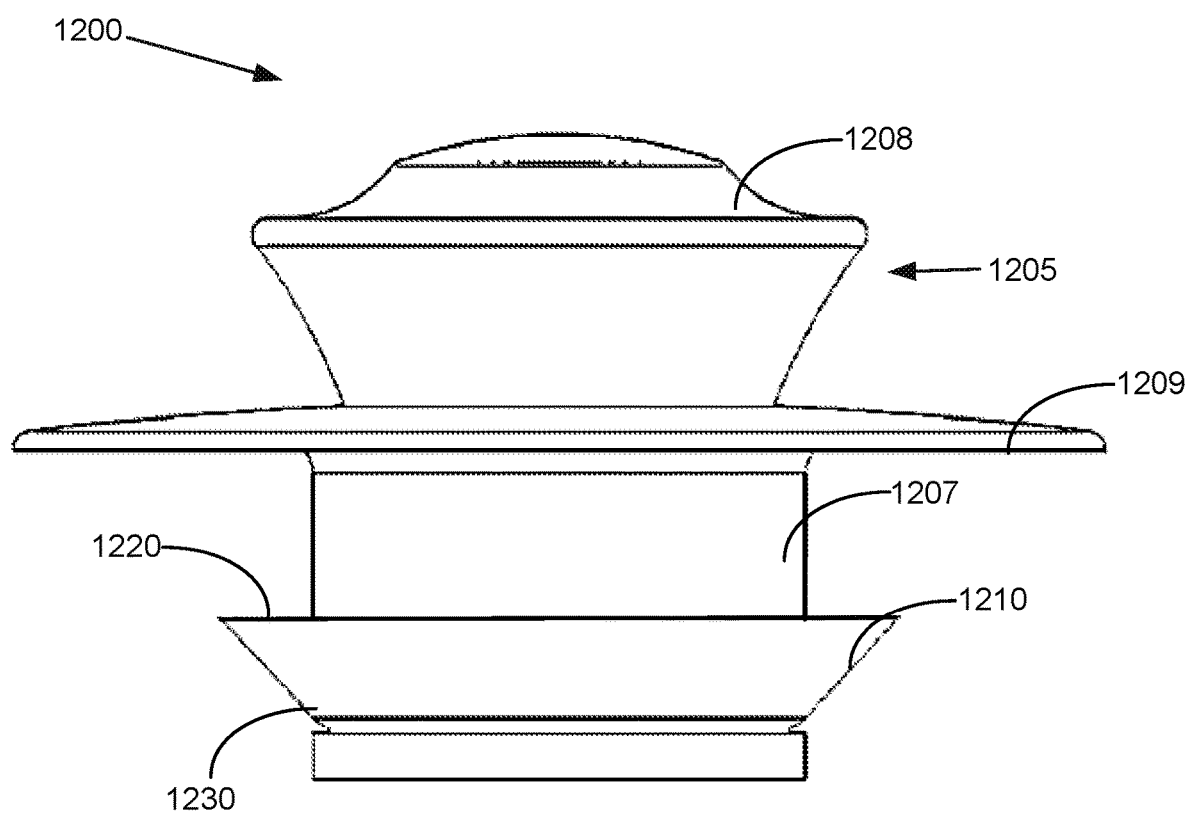
FIG. 12 is a diagram of an embodiment of a drain closure assembly in accordance with embodiments of the present disclosure.

Referring now to FIG. 12, an alternative embodiment of a drain closure assembly 1200 is illustrated. Such an embodiment opens and closes drains and may replace lift and turn, push button, and trip lever style drains. In one embodiment, the drain closure assembly 1200 features a drain stopper 1205 having a metal construction. The drain stopper 1205 includes a head or cap 1208 that is able to be pulled or pushed to and from a drain opening. Accordingly, an upper flange 1209 is below the head/cap 1208 and is sized to cover and extend over the drain opening.

Instead of requiring o-ring(s) to fit the drain, the drain closure assembly of the present disclosure provides an improved gasket seal 1210. Therefore, instead of supplying several differently sized o-rings with the drain closure assembly 1200, a single gasket seal 1210 or a pair of gasket seals can be supplied to accommodate varying diameters of drains and essentially make the product more "universal" in fitting a wide variety of drain diameters. Accordingly, in one embodiment, a gasket seal 1210 may be provided having the following dimensions: 38.1 mm (1.5 inches) in width at widest section; 34.29 mm (1.35 inches) in width at its opposing side; and 5.36 mm in thickness (0.21 inches). In one embodiment, an additional gasket seal may also be provided having the following dimensions: 47.63 mm (1.88 inches) in width at widest section and 35.16 mm (1.38 inches) in width at its opposing side.

To install, an exemplary gasket seal 1210 is positioned on a drain stopper 1205, such as a tub stopper or sink stopper. In some embodiments, the drain stopper 1205 may feature a groove 1206 upon which the gasket seal 1210 may be positioned. The gasket seal 1210 may be characterized as having a right circular cone shape or a frusto-conical shape. As part of the assembly 1200, the top portion 1220 of the gasket seal 1210 has a wider diameter than the bottom portion 1230. Accordingly, the bottom portion 1230 projects generally upwards towards the top portion 1220 of the gasket seal 1200. The top portion 1220 of the gasket seal has a central circular opening that is arranged to fit closely around an annular groove of a stem or post 1207 that is underneath the head or cap 1208 of the drain stopper assembly 1200 and upper flange 1209.

To close the drain, the drain stopper 1200 can be inserted in the drain and pushed down to create a seal. When the drain stopper 1200 is in a closed position, the angled slope (approximately 45 degrees) of the gasket seal 1210 is pressed against the side of the drain to form a tight seal which closes the drain passage. To open the drain, the stopper head 1208 can be depressed to access the drain opening in 1200.

Figure 13:
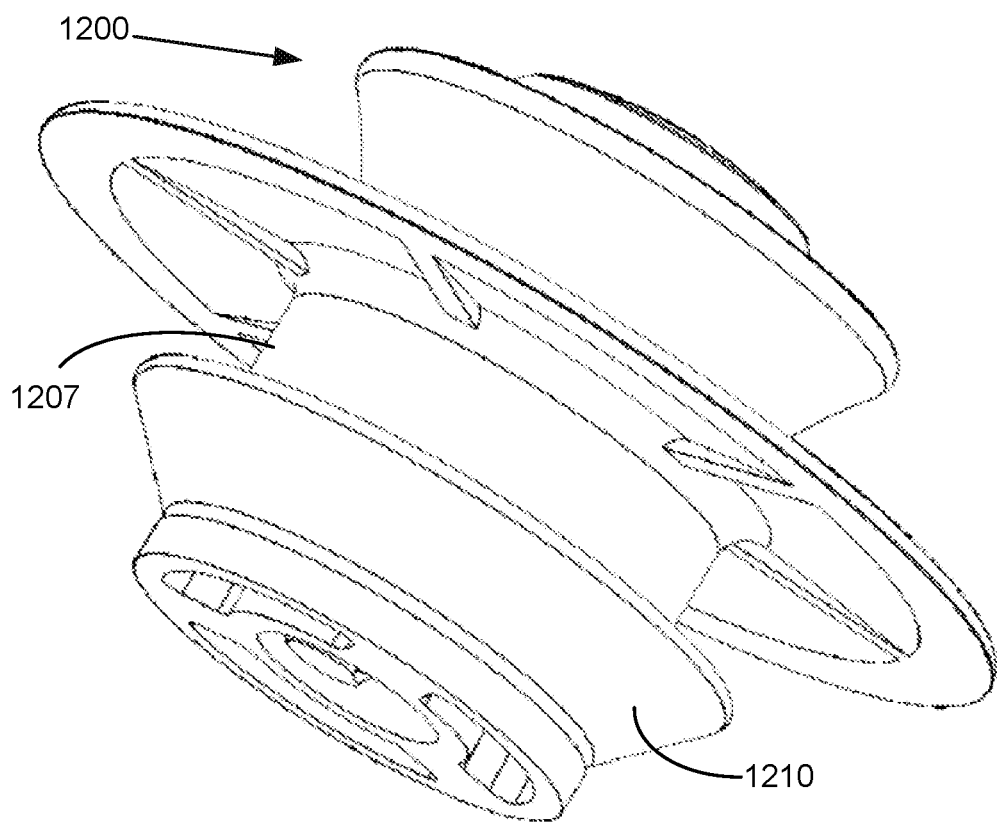
FIGS. 13-14 are diagrams showing perspective views of the drain closure assembly in accordance with embodiments of the present disclosure.
Figure 14:
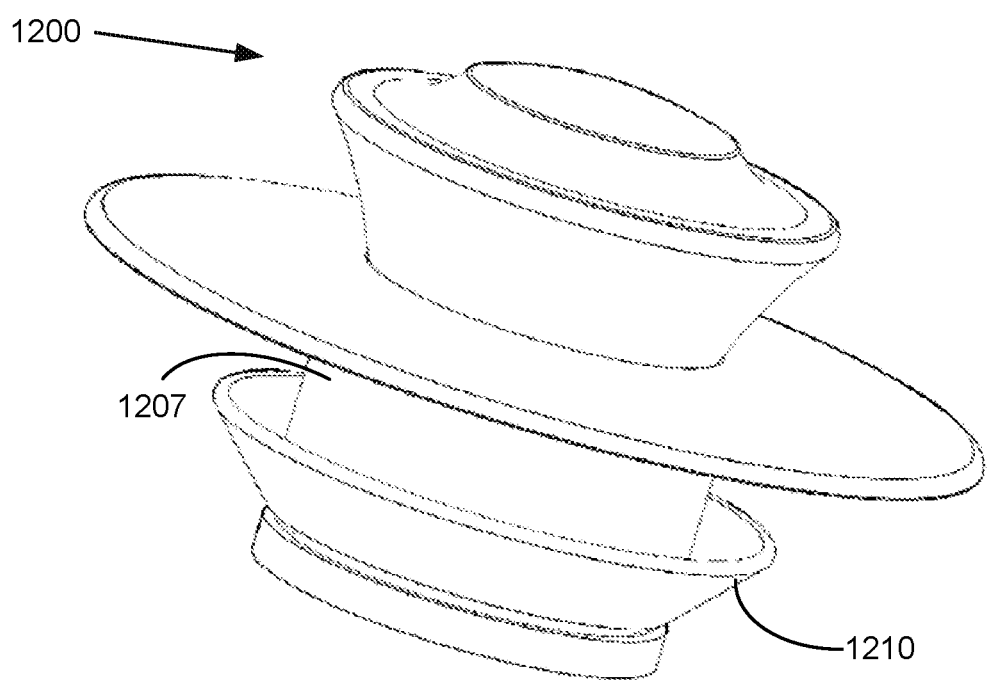
Figure 15:
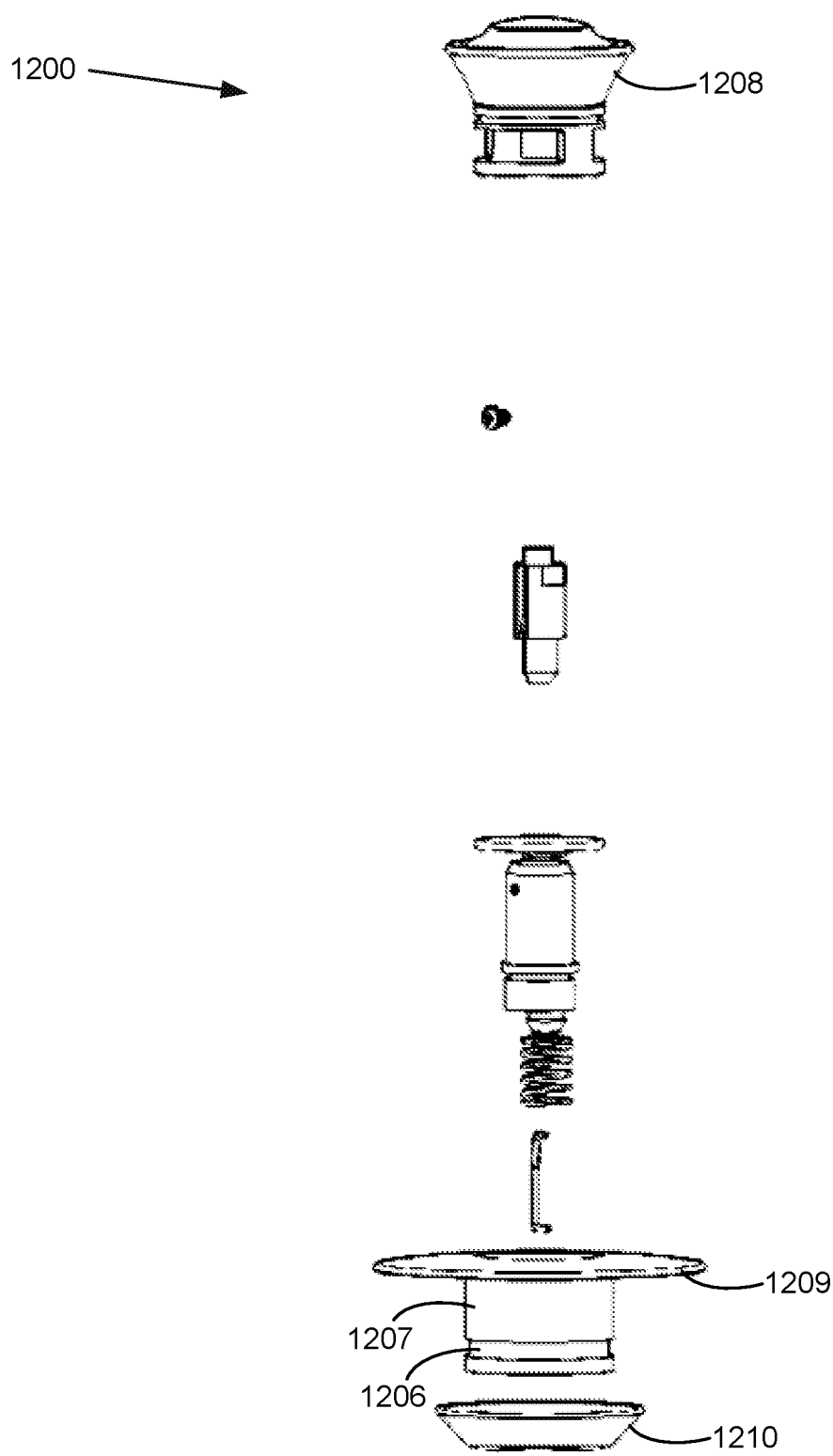
FIG. 15 is a diagram showing an exploded view of the drain closure assembly in accordance with embodiments of the present disclosure.
Figure 16:
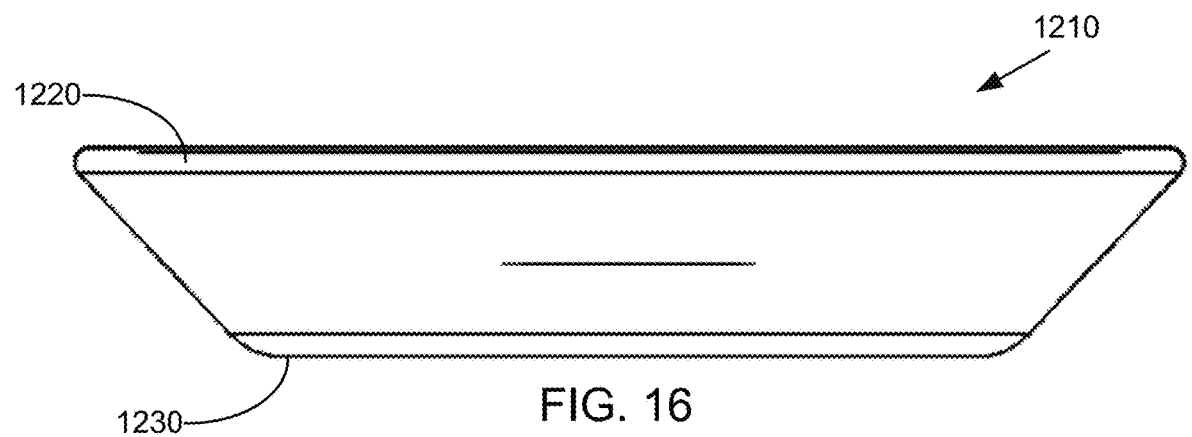
FIG. 16 is a diagram showing a side view of the gasket seal of the drain closure assembly in accordance with embodiments of the present disclosure.
Figure 17:
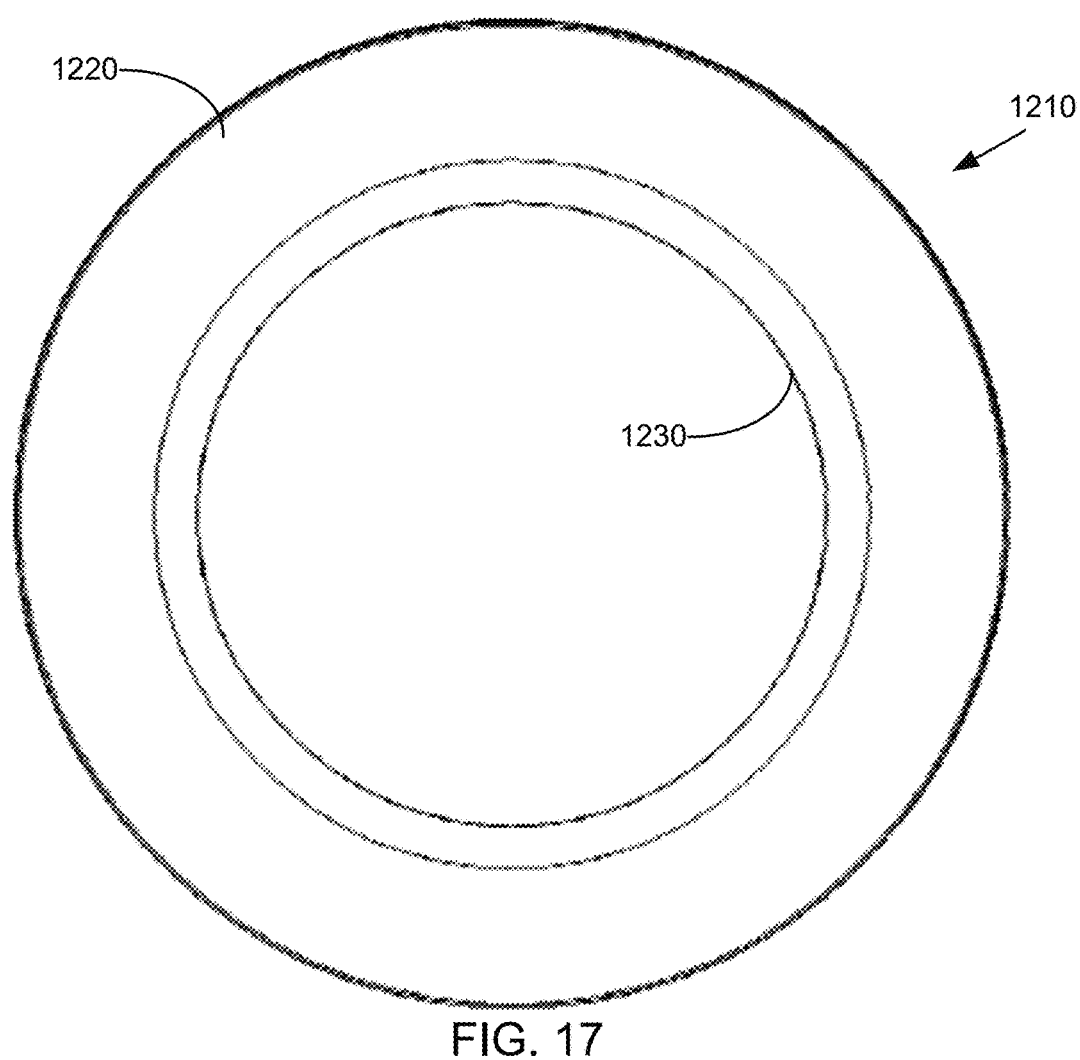
FIG. 17 is a diagram showing a top view of the gasket seal of the drain closure assembly in accordance with embodiments of the present disclosure.
Figure 18:
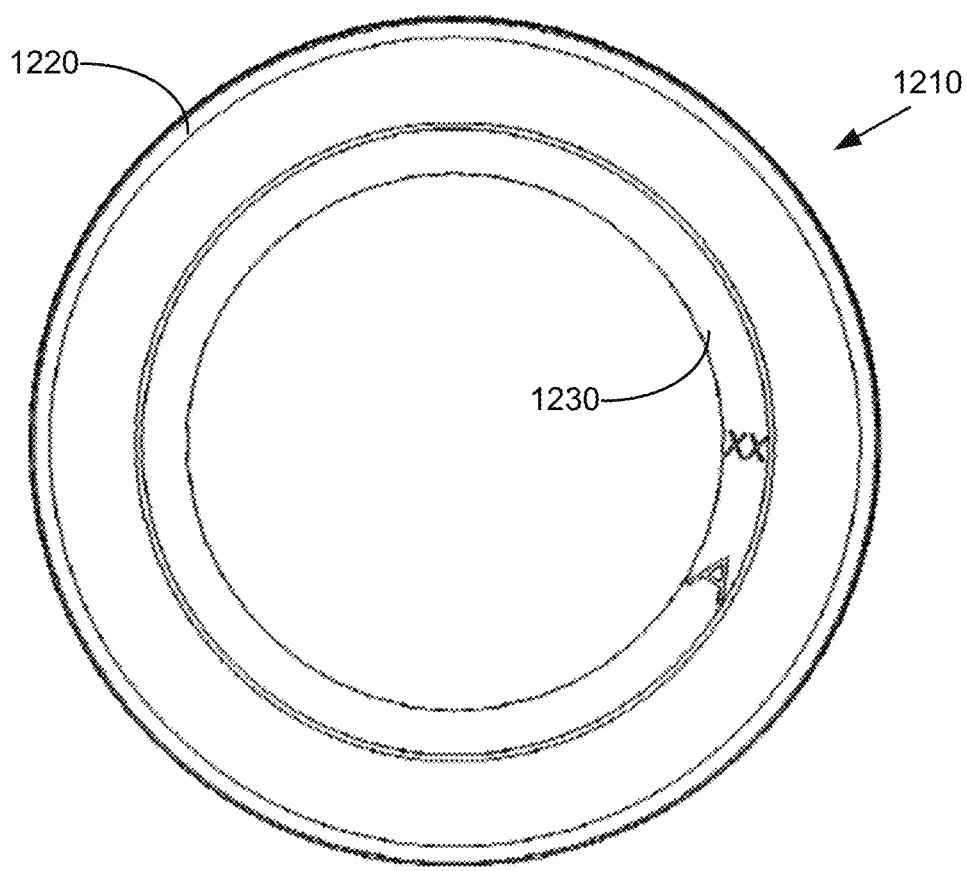
FIG. 18 is a diagram showing a bottom view of the gasket seal of the drain closure assembly in accordance with embodiments of the present disclosure.
Figure 19:
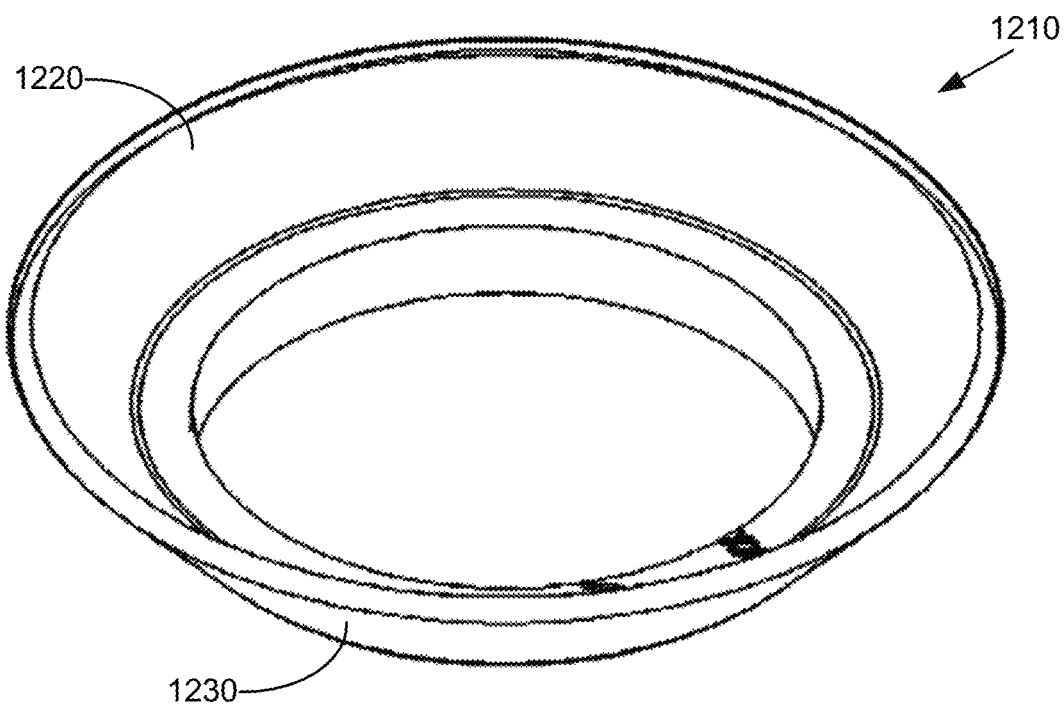
FIG. 19 is a diagram showing a perspective top view of the gasket seal of the drain closure assembly in accordance with embodiments of the present disclosure.
Figure 20:
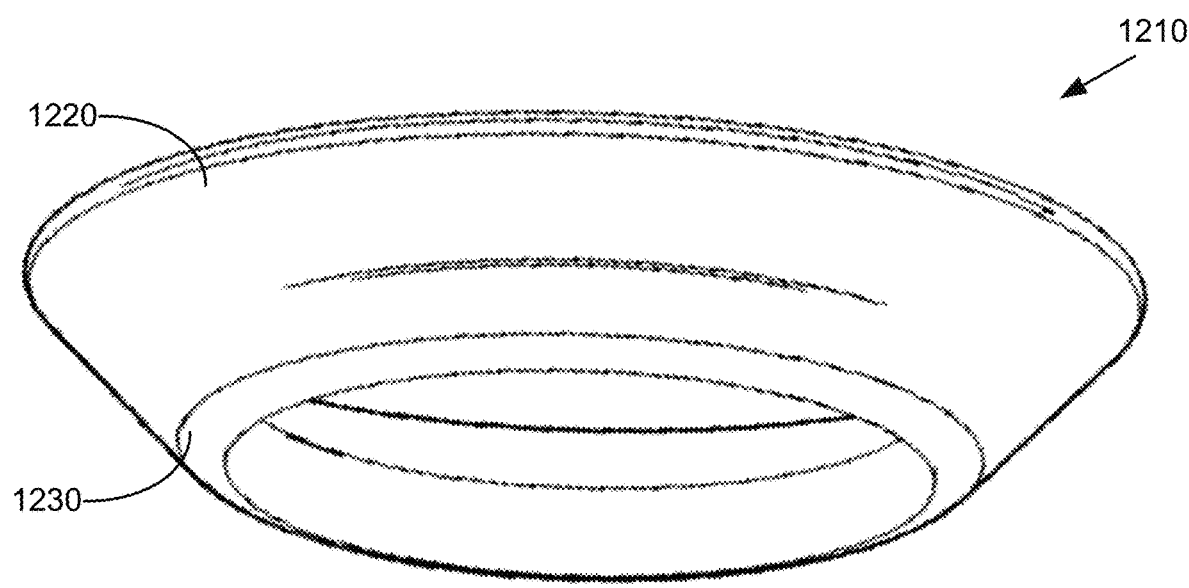
FIG. 20 is a diagram showing a perspective bottom view of the gasket seal of the drain closure assembly in accordance with embodiments of the present disclosure.

Different views of the drain closure assembly 1200 and gasket seal 1210 are provided herein. Accordingly, FIGS. 13-14 show different perspective views of the drain closure assembly 1200. FIG. 15 illustrates an exploded view of the drain closure assembly 1200 in accordance with embodiments of the present disclosure. Likewise, FIG. 16 depicts side view of the improved gasket seal 1210 of the drain closure assembly 1200 in accordance with embodiments of the present disclosure. FIGS. 17-18 show top and bottom views of the gasket seal 1210 of the drain closure assembly 1200 in accordance with embodiments of the present disclosure. FIGS. 19-20 depict perspective top and bottom views of the gasket seal 1210 of the drain closure assembly 1200 in accordance with embodiments of the present disclosure.

It should be emphasized that the above-described embodiments of the present disclosure are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of this disclosure.

Therefore, at least the following is claimed:

1. A drain closure assembly comprising:
   a domed cap at a top portion of the drain closure assembly, wherein the domed cap is a solid monolithic piece and is configured to be pressed to open and close a drain passage for the drain closure assembly, wherein the domed cap includes a dome top portion, a tapered middle portion, and an opening at a bottom portion;
   a flange that includes an opening for at least the bottom portion of the domed cap to be pressed into;
   a stem that extends from below the flange to a bottom portion of the drain closure assembly, wherein the stem and flange form a solid monolithic piece; and
   a gasket seal that is positioned around the stem at a bottom of the drain closure assembly before an end of the stem such that the gasket seal is not in contact with the flange, wherein the gasket seal has a frusto-conical shape, wherein a top portion of the gasket seal has a wider diameter than a bottom portion of the gasket seal, and wherein the gasket seal has a central circular opening that fits closely around the stem.

2. The drain closure assembly of claim 1, wherein the stem features a groove upon which the gasket seal is positioned.

3. The drain closure assembly of claim 1, wherein an outer diameter of the gasket seal at the top portion is 38.1 mm in width and the outer diameter of the gasket seal at the bottom portion is 34.29 mm.

4. The drain closure assembly of claim 1, wherein an outer diameter of the gasket seal at the top portion is 47.63 mm in width and the outer diameter of the gasket seal at the bottom portion is 35.16 mm.

5. The drain closure assembly of claim 1, wherein the gasket seal is an elastic resilient material.

6. The drain closure assembly of claim 1, wherein the domed cap of the drain closure assembly is a metallic material.

7. The drain closure assembly of claim 1, wherein the domed cap of the drain closure assembly is a plastic material.

8. The drain closure assembly of claim 1, wherein the gasket seal has an angled slope of 45 degrees.

9. A drain closure assembly of claim 1, wherein the drain closure assembly is part of a drain closure assembly kit that includes an additional gasket seal of a same shape as and of different dimensions as the gasket seal.

* * * * *